United States Patent
Lindner et al.

(10) Patent No.: US 6,565,790 B2
(45) Date of Patent: May 20, 2003

(54) INJECTION-MOLDING AN ELECTRICAL-CONNECTOR SHELL

(75) Inventors: Ulrich Lindner, Kierspe (DE); Jürgen Oesterreich, Gummersbach (DE); Dieter Kaffenberger, Wiehl (DE)

(73) Assignee: Erich Wippermann GmbH, Halver (DE)

( * ) Notice: Subject to any disclaimer, the term of this patent is extended or adjusted under 35 U.S.C. 154(b) by 0 days.

(21) Appl. No.: 09/904,452

(22) Filed: Jul. 12, 2001

(65) Prior Publication Data

US 2002/0048983 A1 Apr. 25, 2002

(30) Foreign Application Priority Data

Jul. 13, 2000  (EP) .............................. 00115214

(51) Int. Cl.7 .......................... B29C 45/14; B29C 70/80
(52) U.S. Cl. ....................... 264/255; 264/268; 264/273
(58) Field of Search ................................ 264/250, 254, 264/255, 267, 268, 273, 259, 275; 29/825, 832, 837

(56) References Cited

U.S. PATENT DOCUMENTS 4,743,422 A     5/1988  Kalriis-Nielsen et al.
4,961,713 A  * 10/1990  McCracken et al. .......... 29/858
5,334,039 A  *  8/1994  Kanda ......................... 264/135
5,861,120 A  *  1/1999  Yagi et al. ................... 264/255
5,894,661 A  *  4/1999  Wada et al. ............. 264/328.8
6,309,578 B1 * 10/2001  Maeda et al. ................ 264/267

FOREIGN PATENT DOCUMENTS

DE     197 19 436     11/1998
EP      0 008 603      3/1980

* cited by examiner

Primary Examiner—Angela Ortiz
(74) Attorney, Agent, or Firm—Herbert Dubno; Andrew Wilford

(57) ABSTRACT

An electrical-connector shell is made by first casting of a first plastic in a first mold a body having an inner wall extending parallel to an axis and having a radially outwardly directed surface, an outer wall extending parallel to the axis and having a radially inwardly directed surface confronting the radially outwardly directed surface and forming therewith an axially extending annular space, and an end wall closing an end of the space, joining ends of the inner and outer walls, and formed with an axially throughgoing hole opening adjacent one of the surfaces. Then this body is enclosed in a second mold formed with an annular cavity open radially toward the one surface and extending to the hole. A second plastic is then injected through the hole into the cavity to form on the one surface an annular seal ring.

8 Claims, 4 Drawing Sheets

INJECTION-MOLDING AN ELECTRICAL-CONNECTOR SHELL

FIELD OF THE INVENTION

The present invention relates to an electrical connector. More particularly this invention concerns a method of injection-molding an electrical-connector shell.

BACKGROUND OF THE INVENTION

An electrical connector of the type mounted on the end of a multiconductor cable typically has a dielectric shell holding a plurality of metal conductors and having a wall extending parallel thereto in an insertion direction. The shell is adapted to fit complementarily by joining together in the insertion direction with a fitting having other conductors that mate with those of the shell to form an electrical connection. Such connectors can be used to transmit signals or power and are typically intended for use under harsh conditions. Thus it is standard to provide some sort of seal between the shell and the fitting it mates with. When such a connector having a shell with a seal engages the appropriate fitting, moisture or the like cannot get into the actual conductors.

In a standard system the shell has a pair of annular concentric walls and the conductors are contained within the inner wall. The fitting engageable with it has an annular outer wall that fits between the inner and outer walls of the shell and central conductors that extend down in the inner wall of the shell and engage complementarily with the conductors therein. The seal can be provided at any of several interfaces.

European patent application 0,008,603 of Schauer describes such a conductor where a simple O-ring is provided in a groove on an outside of the shell holding two male conductors. Thus here the shell is a simple solid body and the seal is provided as a separate element which is fitted to the shell after it is manufactured, for instance by injection molding. German published application 197 19 436 of Siedentopf shows that the conductors can be molded right into the body of the connector.

In an unrelated field, U.S. Pat. No. 4,3743,422 of Kalriis-Nielsen proposes a pipe-joint seal comprising a stiff outer ring adapted to engage over the end and outer surface of an end of a piece of pipe, and a softer inner seal ring that engages over the end surface and projects down inside the pipe. In this manner, when an end of another pipe is fitted inside the piece provided with this seal, the inner ring will snugly engage the other pipe and form a tight seal. This two-part seal is formed in successive stages by molding in a very complex manner. The hard outer ring is made between two mold parts, one of which is reused for molding the inner ring. The inner ring is weakly attached to the outer ring, an insignificant problem as this system is not intended to withstand significant stresses parallel to the axial insertion direction.

OBJECTS OF THE INVENTION

It is therefore an object of the present invention to provide an improved electrical-conductor shell.

Another object is the provision of an improved method of making an electrical-conductor shell which overcomes the above-given disadvantages, that is which produces a shell suitable for use as an electrical conductor in a simple procedure with simple equipment.

A further object is to provide such a production method which produces a connector shell where a seal ring formed normally of an elastomer much softer than the plastic of the shell is very solidly anchored in the shell for resistance to axial forces.

SUMMARY OF THE INVENTION

An electrical-connector shell is made according to the invention by first casting of a first plastic in a first mold a body having an inner wall extending parallel to an axis and having a radially outwardly directed surface, an outer wall extending parallel to the axis and having a radially inwardly directed surface confronting the radially outwardly directed surface and forming therewith an axially extending annular space, and an end wall closing an end of the space, joining ends of the inner and outer walls, and formed with an axially throughgoing hole opening adjacent one of the surfaces. Then this body cast in the first mold is enclosed in a second mold formed with an annular cavity open radially toward the one surface and extending to the hole. A second plastic is then injected through the hole into the cavity to form on the one surface an annular seal ring.

As a result of the in-situ formation of the seal ring and the fact that it extends down the one surface to and into the hole, this seal ring is very solidly anchored to the shell. The seal can in fact form an annular skirt extending all the way down the one surface to the end wall to maximize surface contact and ensure that it will remain solidly attached to the one surface.

According to the invention the one surface is the outer surface of the inner wall. Thus the seal projects outward and is formed in accordance with the invention with at least one radially projecting annular ridge, normally two to four.

The first plastic according to the invention is a polyamide, polybutylenterephthalate, or polyethylene terephthalate. Thus the shell body is quite hard and durable even up to temperatures as high as 40° C. The second plastic is a silicone elastomer including a bonding agent or a thermoplastic elastomer so that it is fairly soft. This agent could be epoxy silane. When no agent is used, the one surface needs to be prepared, for instance by flaming. The thermoplastic elastomer can be polyetherblockamide with polycarbonate.

The electrical-connector shell has according to the invention a body formed unitarily of a first plastic with an annular inner wall extending parallel to an axis and having a radially outwardly directed outer surface, an annular outer wall extending parallel to the axis and having a radially inwardly directed inner surface confronting the outer surface and forming therewith an axially extending space, and an end wall closing an end of the space, joining ends of the inner and outer walls, and formed with an axially throughgoing hole opening adjacent one of the surfaces. It also has a seal ring of annular shape projecting radially from the one surface and having a portion extending along the one surface to and into the hole.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
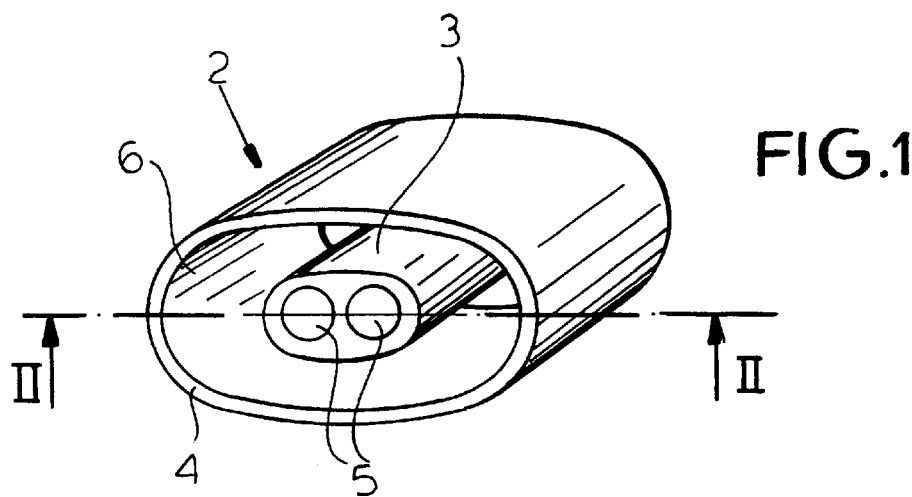
FIG. 1 is a perspective front-end view of a shell according to the invention before provision with a seal ring.
Figure 2:
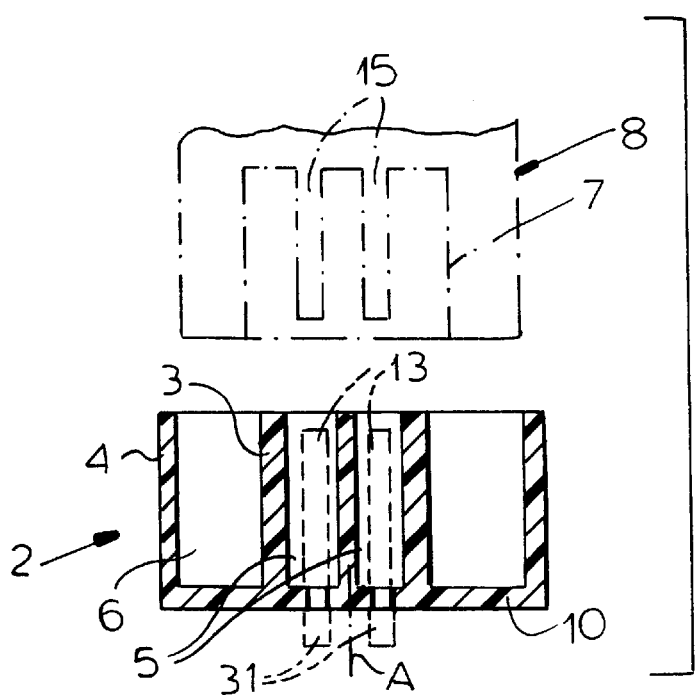
FIG. 2 is a section taken along line II—II of FIG. 1.
Figure 3:
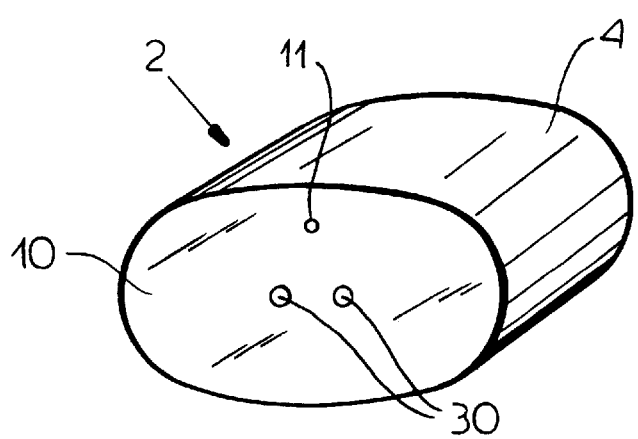
FIG. 3 is a perspective rear-end view of the shell of FIG. 1.

As seen in FIGS. 1 through 3 a shell 2 according to the invention comprises an inner part 3 of oval section relative to a center axis A, an outer wall 4 of identical section and forming with the inner party 3 an annular cavity or space 6, and a transverse end wall 10 closing an end of the space 6 and joining together the ends of the part 3 and wall 4. The inner part 3 is formed with two parallel cylindrical holes or passages 5 adapted to receive respective conductors illustrated schematically at 13. In addition it has a smooth and uninterrupted outer surface that extends parallel to the axis A.

The floor wall 10 closing the base of these holes 5 is formed with a pair of throughgoing holes or passages 30 through which the conductors 13 pass. In addition as will be described below, the floor wall 10 is formed at the outer face of the inner part 3 with an axially throughgoing passage or hole 11. The connector shell 2 is adapted to fit with another connector or fitting shown in dot-dash lines at 8 and having an inner wall adapted to fit around the part 3 and conductors 15 adapted to rate with the conductors 13.

Figure 4:
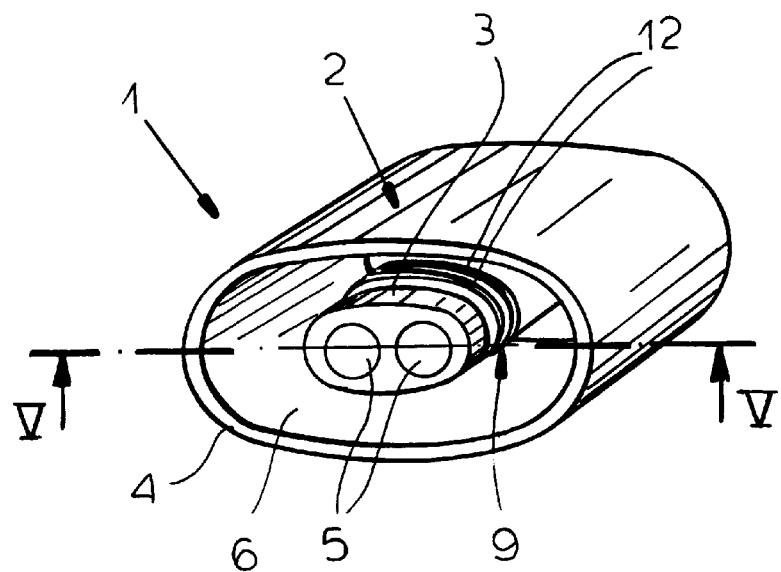
FIG. 4 is a view like FIG. 1 of the completed shell.
Figure 5:
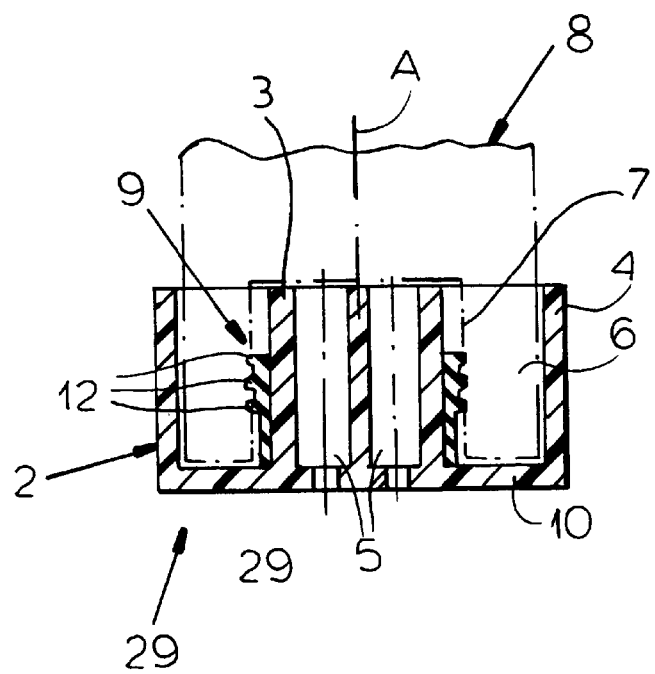
FIG. 5 is a section taken along line V—V of FIG. 4.

FIGS. 4 and 5 show how before use such a shell 2 is provided with a seal ring 9 fitted snugly around the outer face of the inner part 3 and bearing outward on an inner surface 7 of the fitting 8. This seal ring 9 has a three outwardly projecting ridges 12 and a skirt 29 that extends all the way down on the outside face of the part 3 from the ridges 12 to the end wall 10.

Figure 6:
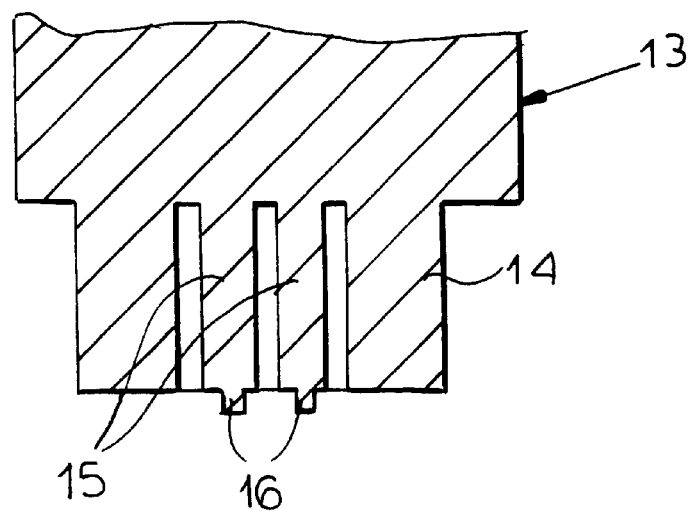
FIGS. 6 and 7 are partly diagrammatic sections through the molds used to make the shell of FIG. 1.
Figure 7:
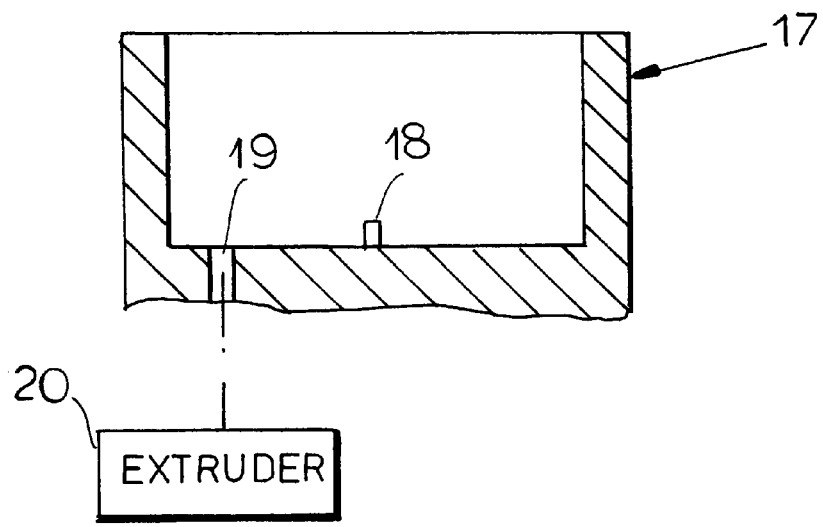

The mold for making the part of FIGS. 1 through 3 is shown in FIGS. 6 and 7. An inner mold part 13 has an annular outer collar 14 adapted to form the space 6 and a pair of inward rods 15 that form the holes 5. The inner ends of the rods 15 are provided with small-diameter projections 16 that form the two holes 30. An outer mold part 17 has a cavity that forms the outer surface of the wall 4 and the back face of the end wall 10 and is formed in a floor of the cavity with a small projection 18 positioned to form the hole 11. When fitted together the projections 16 of the part 13 engage the floor of the cavity of the part 17 and the projection 18 engages the end of the outer collar 14. A sprue 19 connected to an extruder 20 allows the resin of the shell 2 to be injected between the fitted-together parts 13 and 17 to form the shell 2 of FIG. 1 as a single integral piece, for instance of a polyamide.

Figure 8:
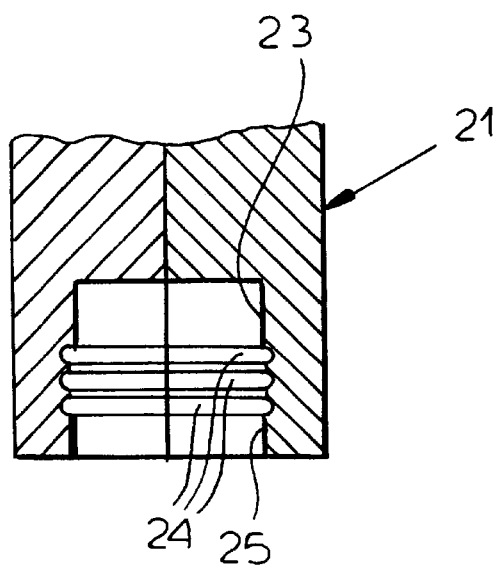
FIGS. 8 and 9 are partly diagrammatic sections through the molds used to complete the shell according to the invention.
Figure 9:
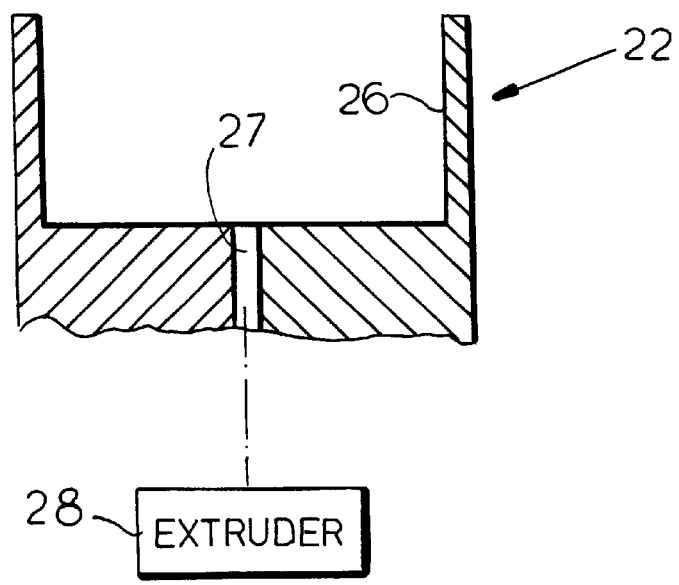

Once the shell 2 of FIG. 1 is made, it is demolded and fitted between two more mold parts 21 and 22 shown in FIGS. 8 and 9. The part 21 is of two diametrally separable parts together forming a cavity 23 adapted to fit snugly around the inner part 3 but having inwardly directed grooves 24 shaped to form the ridges 12 and an wall portion 25 stepped outward to form the skirt 29. The outer part 22 has a simple cup-shaped cavity 26 and is formed with a sprue 27 connected to an extruder 28 and positioned to align with the hole 11 of the shell 2. Thus once the shell 2 is fitted between these two parts 21 and 22, a thermoplastic elastomer can be injected through the sprue 27 and hole 11 to form the seal 9. Then the parts of the mold half 21 are spread radially and the finished shell 2 with the sea). 9 is demolded from the mold parts 21 and 22.

The resultant assembly is extremely rugged and provides excellent sealing around the inner part 3. The seal 9 is formed in situ on the part 3 for good adherence and the skirt 29 projecting down along it maximizes the contact area over which it is attached. The seal 9 even normally extends somewhat down into the hole 11 so that it is very solidly attached to the shell 2.

We claim:

1. A method of making an electrical-connector shell, the method comprising the steps of sequentially:

casting of a first plastic in a first mold a body having
    an inner wall extending parallel to an axis and having a radially outwardly directed surface,
    an outer wall extending parallel to the axis and having a radially inwardly directed surface confronting the radially outwardly directed surface and forming therewith an axially extending annular space, and
    an end wall closing an end of the space and joining ends of the inner and outer walls;

enclosing the body cast in the first mold in a second mold forming an annular cavity open radially toward one of the surfaces;

injecting a second plastic comprised of silicone or polyetherblockamide with polycarbonate into the cavity and thereby forming on the one surface an annular seal ring.

2. The method defined in claim 1 wherein the one surface is the outer surface of the inner wall.

3. The method defined in claim 1 wherein the cavity forms at least one radially projecting annular ridge on the seal ring.

4. The method defined in claim 1 wherein the first plastic is a polyamide, polybutylenterephthalate, or polyethylenterephthalate.

5. The method defined in claim 1 wherein the second plastic is a silicone elastomer including a bonding agent.

6. The method defined in claim 1 wherein the second plastic is a thermoplastic elastomer.

7. The method defined in claim 1 wherein the end wall is formed with an axially throughgoing hole opening adjacent one of the surfaces, the annular cavity extending to the hole, the second plastic being injected through the hole into the cavity.

8. The method defined in claim 1, further comprising the step of fixing an electrical conductor to the shell inside the inner wall and extending parallel to the axis.

* * * * *